United States Patent
Oteri et al.

(10) Patent No.: US 12,414,180 B2
(45) Date of Patent: Sep. 9, 2025

(54) MULTI-SLOT PDCCH MONITORING AND SEARCH SPACE SET GROUP SWITCHING

(71) Applicant: Apple Inc., Cupertino, CA (US)

(72) Inventors: Oghenekome Oteri, San Diego, CA (US); Hong He, San Jose, CA (US); Huaning Niu, San Jose, CA (US); Sigen Ye, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 18/166,628

(22) Filed: Feb. 9, 2023

(65) Prior Publication Data

US 2023/0262808 A1    Aug. 17, 2023

Related U.S. Application Data

(60) Provisional application No. 63/267,849, filed on Feb. 11, 2022.

(51) Int. Cl.
*H04W 76/15* (2018.01)
*H04W 72/0446* (2023.01)

(52) U.S. Cl.
CPC ....... *H04W 76/15* (2018.02); *H04W 72/0446* (2013.01)

(58) Field of Classification Search
CPC ............................ H04W 76/15; H04W 72/0446
See application file for complete search history.

(56) References Cited

U.S. PATENT DOCUMENTS

| | | | |
|---|---|---|---|
| 11,395,283 B2 * | 7/2022 | Lin | ................. H04W 48/16 |
| 2020/0329461 A1 | 10/2020 | Yang et al. | |
| 2025/0008434 A1 * | 1/2025 | Wang | ................. H04W 52/0235 |

FOREIGN PATENT DOCUMENTS

WO    2020/246858    12/2020

OTHER PUBLICATIONS

LG Electtronics, 'Discussion on PDCCH-based power saving signal/channel', R1-1906695, 3GPP TSG RAN WG1 Meeting #97, Reno, USA, May 13-17, 2019, pp. 1-6. (Year: 2019).*
Moderator, "PDCCH Monitoring Alternatives"; 3GPP TSG RAN WG1, Meeting #104-e, Feb. 5, 2021, 14 sheets.
Moderator (Lenovo), "Draft Discussion on PDCCH monitoring Enhancements"; 3GPP TSG RAN WG1, Meeting #106, Aug. 27, 2021, 50 sheets.

* cited by examiner

*Primary Examiner* — Melvin C Marcelo
(74) *Attorney, Agent, or Firm* — Fay Kaplun & Marcin, LLP (57) ABSTRACT

A user equipment (UE) configured to receive configuration information for a first search space (SS) set of a first slot group for multi-slot physical downlink control channel (PDCCH) monitoring (MSM), receive configuration information for a second SS set of a second slot group for MSM, perform MSM based on the first SS set and switch from the first SS set to the second SS set using one of a first type of search space set group (SSSG) switching or a second type of SSSG switching.

20 Claims, 7 Drawing Sheets

MULTI-SLOT PDCCH MONITORING AND SEARCH SPACE SET GROUP SWITCHING

BACKGROUND

This application claims priority to U.S. Provisional Application Ser. No. 63/267,849 filed on Feb. 11, 2022 and entitled "Multi-Slot PDCCH Monitoring and Search Space Set Group Switching," the entirety of which is incorporated herein by reference.

BACKGROUND

In a Fifth Generation (5G) New Radio (NR) network, for communication above 52.6 Giga hertz (GHz), the subcarrier spacing (SCS) may be increased to provide robustness to phase noise. For example, the SCS may be set to 120 kilo hertz (kHz), 480 kHz or 960 kHz. However, increasing the SCS may result in a reduction in the duration of the symbol which may place an unreasonable strain on user equipment (UE) processing resources during physical downlink control channel (PDCCH) monitoring. It has been identified that multi-slot PDCCH monitoring may be used to improve the efficiency of PDDCH monitoring for communication above 52.6 GHz.

SUMMARY

Some exemplary embodiments are related to a processor of a user equipment (UE) configured to perform operations. The operations include receiving configuration information for a first search space (SS) set of a first slot group for multi-slot physical downlink control channel (PDCCH) monitoring (MSM), receiving configuration information for a second SS set of a second slot group for MSM, performing MSM based on the first SS set and switching from the first SS set to the second SS set using one of a first type of search space set group (SSSG) switching or a second type of SSSG switching.

Other exemplary embodiments are related to a processor of a base station configured to perform operations. The operations include transmitting configuration information to a user equipment (UE) for a first search space (SS) set of a first slot group for multi-slot physical downlink control channel (PDCCH) monitoring (MSM) and transmitting configuration information to the UE for a second SS set of a second slot group for MSM, wherein the UE is configured to perform search space set group (SSSG) switching between the first SS and the second SS.

Still further exemplary embodiments are related to a method performed by a user equipment (UE). The method includes receiving configuration information for a first search space (SS) set of a first slot group for multi-slot physical downlink control channel (PDCCH) monitoring (MSM), receiving configuration information for a second SS set of a second slot group for MSM, performing MSM based on the first SS set and switching from the first SS set to the second SS set using one of a first type of search space set group (SSSG) switching or a second type of SSSG switching.

DETAILED DESCRIPTION

The exemplary embodiments may be further understood with reference to the following description and the related appended drawings, wherein like elements are provided with the same reference numerals. The exemplary embodiments relate to enabling multi-slot physical downlink control channel (PDCCH) monitoring (MSM).

The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

In a Fifth Generation (5G) New Radio (NR) network, for communication above 52.6 Giga hertz (GHz), the subcarrier spacing (SCS) may be increased to provide robustness to phase noise. For example, the SCS may be set to 120 kilo hertz (kHz), 480 kHz or 960 kHz. However, increasing the SCS may result in a reduction in the duration of the symbol. From the perspective of the UE, the reduction in symbol duration may increase the number of operations that are to be performed by the UE for PDCCH monitoring which may place an unreasonable strain on UE processing resources.

It has been identified that it may be beneficial to utilize MSM for communication above 52.6 GHz. MSM may allow the UE to avoid the processing strain associated with other PDDCH monitoring approaches. However, while the exemplary techniques described herein may provide benefits to 5G NR communication above 52.6 GHz, the exemplary embodiments are not limited to this frequency range. Moreover, the exemplary embodiments may also be applied to future releases of the cellular standards, e.g., 6G.

MSM may generally refer to a PDCCH monitoring approach that is based on slot groups that each comprise multiple consecutive slots. The UE may perform PDCCH monitoring within a search space (SS) during one or more slots of each slot group. To provide a general example, if a slot group comprises 4 consecutive slots, the UE may perform PDCCH monitoring during a SS within one or more slots of the 4 consecutive slots of the slot group. The UE may be configured with multiple slot groups that are each associated with the same or different frequency resources and/or overlap (fully or partially) in the time domain.

The exemplary embodiments relate to SS set group (SSSG) switching. Those skilled in the art will understand that the UE may be configured with multiple different SS sets for PDCCH monitoring. To differentiate between different SS sets, each SS set may correspond to a different group index (e.g., 0, 1, etc.). The network may provide the UE with the group index for the different SS sets in a SS group ID list information element (IE). During operation, the UE may switch between different SSSGs for PDCCH monitoring.

Figure 1:
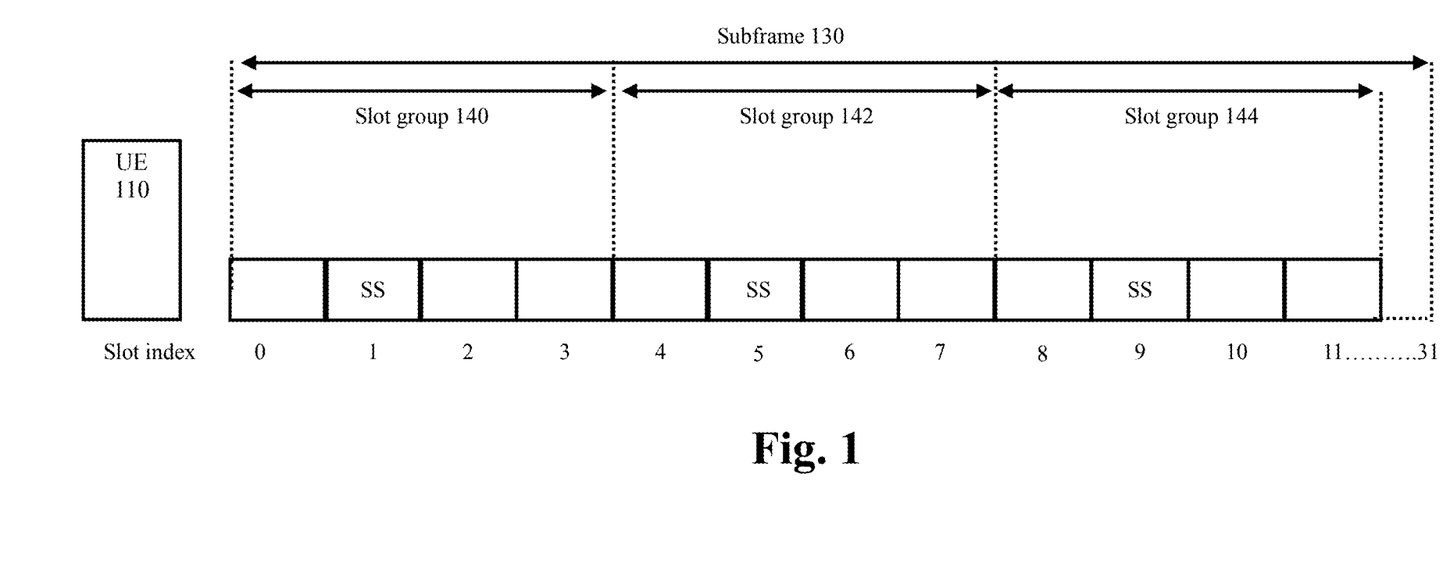
FIG. 1 shows an exemplary set of slot groups within a subframe according to various exemplary embodiments.

As will be described in more detail below, the exemplary embodiments introduce techniques related to the interaction between release 17 (Rel-17) SSSG switching mechanisms and release 16 (Rel-16) SSSG switching mechanisms. Each of the exemplary techniques may be used independently from one another, in conjunction with currently implemented MSM mechanisms, in conjunction with future implementations of MSM mechanisms or independently from other MSM mechanisms. Multi-Slot PDCCH Monitoring General Framework FIG. 1 shows an exemplary set of slot groups 140-144 within a subframe 130 according to various exemplary embodiments. This exemplary slot group arrangement is not intended to limit the exemplary embodiments in any way and is merely provided as a general overview of the relationship between a slot group and a subframe. A subframe may comprise 1 slot or multiple slots (e.g., 2, 4, 5, 12, 16, etc.) and the exemplary embodiments are not limited to any particular number of slots or slot groups per subframe.

The UE 110 may be configured with a PDCCH that includes multiple subframes 130. In this example, the PDCCH may be configured with a SCS of 480 KHz and 32 slots per subframe. FIG. 1 shows a portion of a subframe 130 with 12 slots indexed 0-11. This portion of subframe 130 is arranged into 3 separate slot groups 140-144 and each slot group 140-144 comprises 4 slots. There are 32 slots per subframe in this example and thus, the remaining portion of subframe 130 that is not pictured in FIG. 1 may include 20 slots indexed 12-31. The slots indexed 12-31 may be arranged into 5 separate groups each comprising a slot group size of 4 slots. Therefore, while only 3 slot groups 140-144 are shown in FIG. 1, subframe 130 may include a total 8 slot groups with a slot group size of 4 slots across its 32 slots.

In this example, the UE 110 may be configured to perform PDCCH monitoring in 1 slot from each of the slot groups 140-144. Thus, in a first slot group 140 comprising slots indexed 0-3, the UE 110 may have a PDCCH SS during slot 1. During slots indexed 0, 2 and 3, the UE 110 has the opportunity to conserve power since the UE 110 is not configured to perform PDCCH monitoring during the other slots 0, 2, 3. In a second slot group 142 comprising slots indexed 4-7, the UE 110 may have a PDCCH SS during slot 5. During slots indexed 4, 6 and 7, the UE 110 has the opportunity to conserve power since the UE 110 is not configured to perform PDCCH monitoring during the other slots 4, 6, 7. In a third slot group 144 comprising slots indexed 8-11, the UE 110 may have a PDCCH SS during slot 9. During slots indexed 8, 10 and 11, the UE 110 has the opportunity to conserve power since the UE 110 is not configured to perform PDCCH monitoring during the other slots 8, 10, 11. The UE 110 may behave in the same manner on the other 5 slot groups referenced above in the remaining portion of subframe 130 that is not pictured in FIG. 1.

Slot groups may be consecutive to one another. Thus, in this example, slot group 140 comprises slots indexed 0-3, slot group 142 comprises slots indexed 4-7 and slot group 144 comprises slots indexed 8-11. The start of a first slot group in a subframe (e.g., slot group 140) may be aligned with a slot boundary (e.g., slot index 0 (not pictured)). The start of each slot group may be aligned with a slot boundary. In this example, there is no gap between the slot groups 140-144. FIG. 1 is not intended to limit the exemplary embodiments in any way and is merely provided as a general overview of the relationship between a slot group and a subframe. The exemplary embodiments may apply to any appropriate SCS, subframe duration, number of slots per subframe, number of slot groups, slot group size, etc.

A control resources set (CORESET) may be defined and based on the CORESET a SS may be defined. The UE 110 may perform PDCCH monitoring within the SS. The following examples provide a general overview of SSs within the slot group framework.

Throughout this description, reference is made to "Group 1" to identify a first set of consecutive slot groups and "Group 2" to identify a second set of consecutive slot groups. Those skilled in the art will understand that MSM Group 1 and Group 2 may be defined in third generation partnership program (3GPP) Specifications. The exemplary embodiments may utilize Group 1 and Group 2 in accordance with the manner in which these terms are defined in 3GPP documents and may be modified in accordance with the exemplary embodiments described herein.

The UE 110 may perform PDCCH monitoring within a SS configured within one or more slots of each slot group. For Group 1, the SSs may include a type 1 common search space (CSS) with dedicated radio resource control (RRC) configuration, a type 3 CSS, a UE specific SS and/or any other appropriate type of SS. For Group 2, the SSs may include a type 1 CSS without dedicated RRC configuration, a type 0 CSS, a type 0A CSS, a type 2 CSS and/or any other appropriate type of SS. Thus, "Group 1" and "Group 2" may encompass different types of SSs. Specific details regarding the arrangement of a Group 1 SS set and a Group 2 SS set are provided below.

The slot group size for Group 1 may be the same as or different than the slot group size for Group 2. In addition, Group 1 and Group 2 may each be associated with the same or different frequency resources and overlap (fully or partially) in the time domain. However, any reference to a particular Group 1 and/or Group 2 arrangement is not intended to limit the exemplary embodiments in any way and is merely provided as an example. The exemplary embodiments may apply to any appropriate SCS, subframe duration, number of slots per subframe, number of slot groups, slot group size, etc.

Group 1 may consist of (Xs) consecutive slots and a SS may be configured within (Ys) consecutive slots within the Xs slots of the slot group. The location of the Ys slots within the slot group may be maintained across different slot groups. To provide an example within the context of FIG. 1, Xs may be equal to 4 (e.g., slot index 0-3) and Ys may be equal to 1. The position of the SS (e.g., Ys) in slot group 140 is the same position of the SS in slot group 142 and 144.

When Ys is equal to 1, the SS may be located anywhere within the Ys slot. However, the SS location may be subject to a gap-span limitation (W, Z) (e.g., release 15 (rel-15) gap-span, feature group (FG) 3-5b). For 480 KHz, the gap-span limitation (W, Z) may be (4, 3) or (7, 3) with a maximum of two monitoring spans per the Ys slot. For 960 KHs, the gap-span limitation (W, Z) may be (7, 3). An example arrangement of a Group 1 slot group is provided below with regard to FIG. 2.

When Ys is greater than 1, the SSs may be located in the first 3 symbols of each of the Ys slots. To provide an example within the context of FIG. 1, if each slot comprised symbols indexed 1-14, the SS in slot 1 of slot group 140 may be located within symbols indexed 1-3. Similarly, the SS in slot 1 of slot group 142 may be located within symbols indexed 1-3 and the SS in slot 1 of slot group 144 may be located within symbols indexed 1-3.

Group 2 may consist of (Xs) consecutive slots and a Group 2 SS may be configured anywhere within the Xs consecutive slots. However, there may be some exceptions such as, but not limited to, type 0 CSS with multiplex pattern 1 and type OA/2 CSS with a SS ID equal to 0, where the location of the SS within the slot group is based on a particular parameter (e.g., time offset, symbol index, etc.) and/or derived based on a particular equation. An example arrangement of a Group 2 slot group is provided below with regard to FIG. 2.

Figure 2:
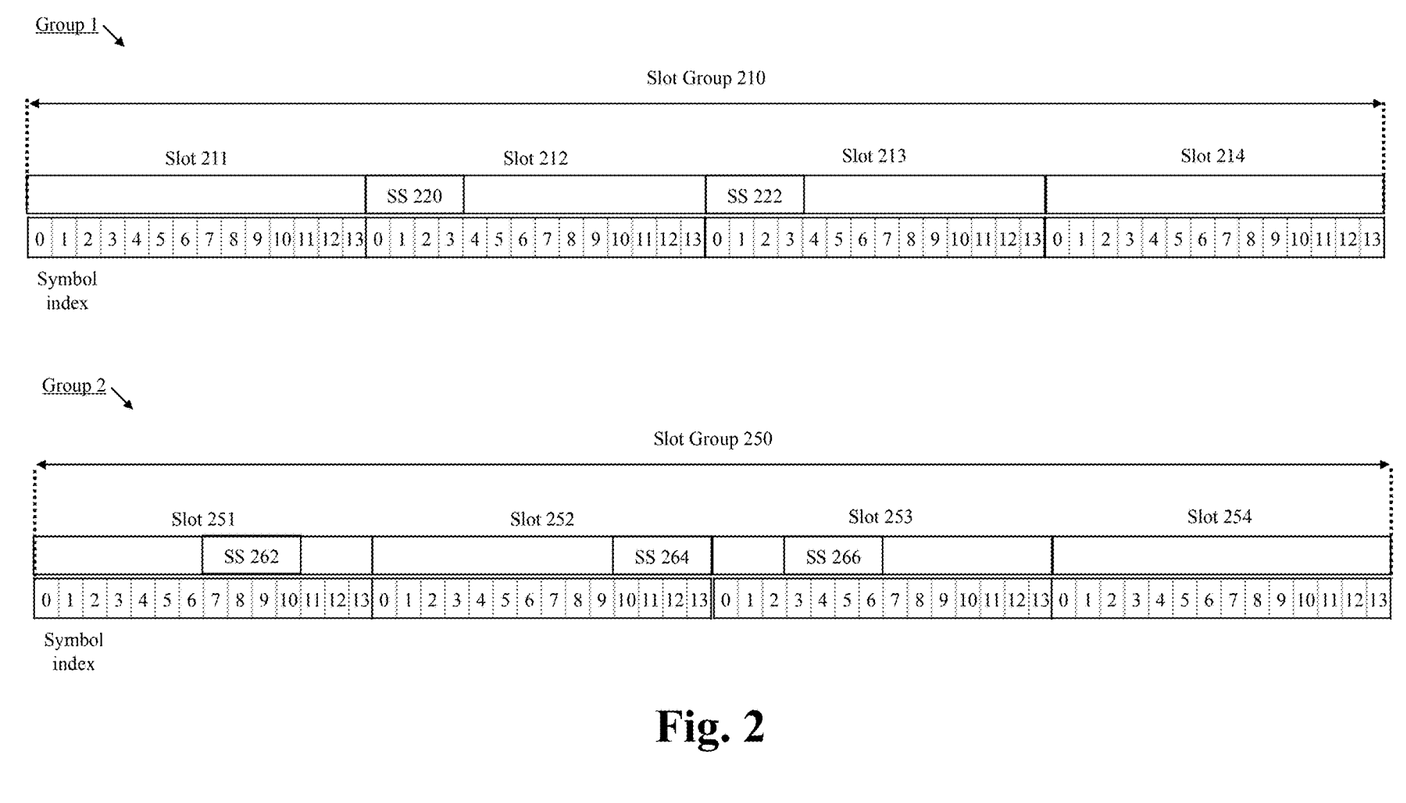
FIG. 2 shows an example arrangement of Group 1 and Group 2 slot groups according to various exemplary embodiments.

FIG. 2 shows an example arrangement of Group 1 and Group 2 according to various exemplary embodiments. The example arrangement depicted in FIG. 2 is not intended to limit the exemplary embodiments in any way and is merely provided to demonstrate a general example of how the exemplary MSM framework described above may be utilized.

In this example, Group 1 is configured with a slot group that comprises (Xs=4) slots. Thus, slot group 210 includes slots 211, 212, 213 and 214. Each slot 211-214 may comprise 14 symbols indexed 0-13. Similarly, Group 2 is also configured with a slot group that comprises (Xs=4) slots. Thus, Slot group 250 includes slots 251, 252, 253 and 254. Each slot 251-254 may comprise 14 symbols indexed 0-13. In this example, the arrangement of slots in Group 1 and Group 2 are the same. However, as mentioned above, the exemplary embodiments are not limited to this arrangement and may utilize any appropriate SCS, subframe duration, number of slots per subframe, number of slot groups, slot group size, etc.

In addition, Group 1 is configured with a Group 1 SS within (Ys=2) slots. In this example, the Ys slots include slot 212 and slot 213. Since Ys is greater than 1, the SS 220 in slot 212 and the SS 222 in slot 213 may be located within the first 3 symbols of each slot (e.g., symbols indexed 0-2). Group 2 is configured with SSs in three slots 251-253. Since a Group 2 SS may be located anywhere within a slot group, the SSs 262, 264 and 266 are shown as being located within a different span of symbols for each of the slot groups 251-253. However, the exemplary embodiments are in no way limited to this Group 2 SS set configuration. This is just one possible example of a Group 2 SS set configuration and the exemplary embodiments may apply to any appropriate Group 2 configuration.

Network Arrangement and Components

Figure 3:
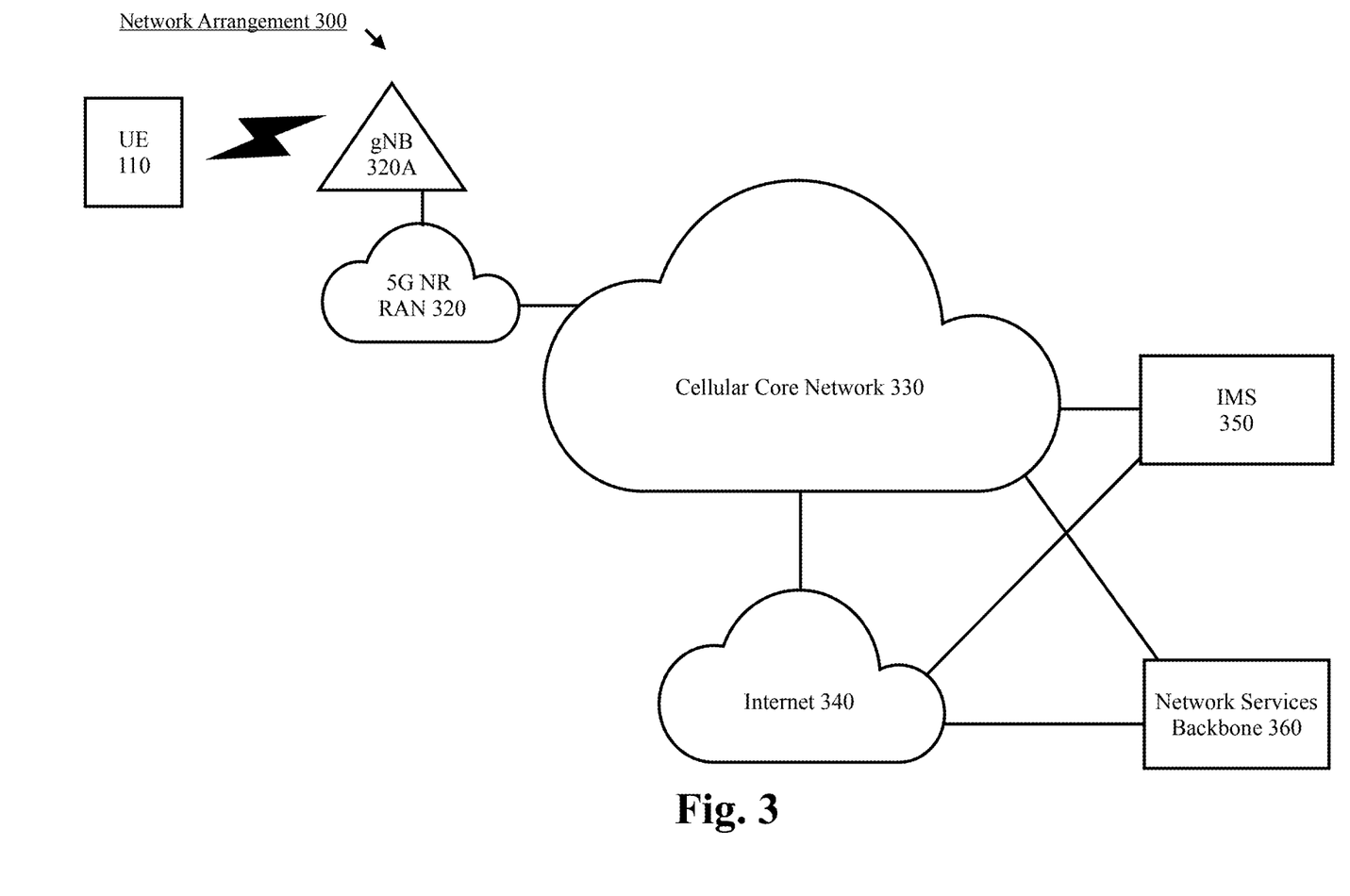
FIG. 3 shows an exemplary network arrangement according to various exemplary embodiments.

FIG. 3 shows an exemplary network arrangement 300 according to various exemplary embodiments. The exemplary network arrangement 300 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 300, the network with which the UE 110 may wirelessly communicate is a 5G NR radio access network (RAN) 320. However, the UE 110 may also communicate with other types of networks (e.g., 5G cloud RAN, a next generation RAN (NG-RAN), a long-term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 320. Therefore, the UE 110 may have a 5G NR chipset to communicate with the 5G NR RAN 320.

The 5G NR RAN 320 may be a portion of a cellular network that may be deployed by a network carrier (e.g., Verizon, AT&T, T-Mobile, etc.). The 5G NR RAN 320 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR PAN 320. For example, as discussed above, the 5G NR PAN 320 may be associated with a particular cellular provider where the UE 110 and/or the user thereof has a contract and credential information (e.g., stored on a SIM card). Upon detecting the presence of the 5G NR PAN 320, the UE 110 may transmit the corresponding credential information to associate with the 5G NR PAN 320. More specifically, the UE 110 may associate with a specific base station, e.g., the next generation Node B (gNB) 320A.

The network arrangement 300 also includes a cellular core network 330, the Internet 340, an IP Multimedia Subsystem (IMS) 350, and a network services backbone 360. The cellular core network 330 may refer an interconnected set of components that manages the operation and traffic of the cellular network. It may include the evolved packet core (EPC) and/or the 5G core (5GC). The cellular core network 330 also manages the traffic that flows between the cellular network and the Internet 340. The IMS 350 may be generally described as an architecture for delivering multimedia services to the UE 110 using the IP protocol. The IMS 350 may communicate with the cellular core network 330 and the Internet 340 to provide the multimedia services to the UE 110. The network services backbone 360 is in communication either directly or indirectly with the Internet 340 and the cellular core network 330. The network services backbone 360 may be generally described as a set of components (e.g., servers, network storage arrangements, etc.) that implement a suite of services that may be used to extend the functionalities of the UE 110 in communication with the various networks.

Figure 4:
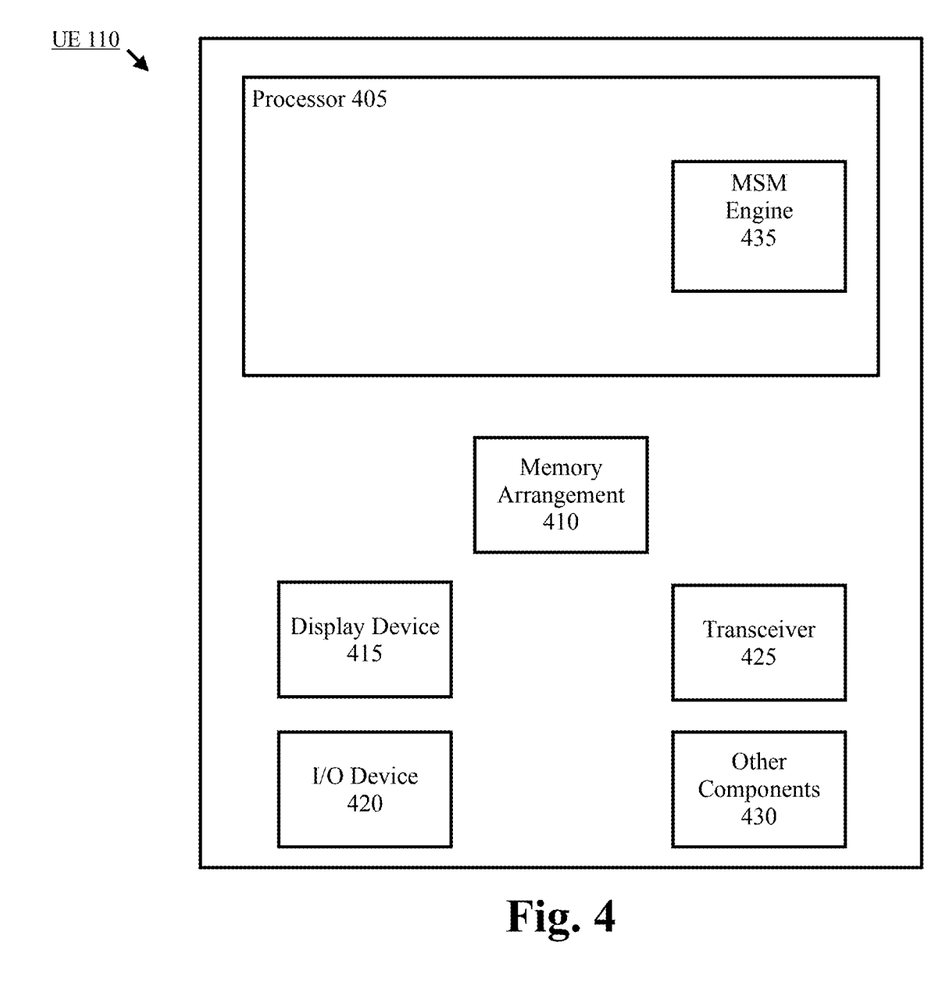
FIG. 4 shows an exemplary user equipment (UE) according to various exemplary embodiments.

FIG. 4 shows an exemplary UE 110 according to various exemplary embodiments. The UE 110 will be described with regard to the network arrangement 300 of FIG. 3. The UE 110 may include a processor 405, a memory arrangement 410, a display device 415, an input/output (I/O) device 420, a transceiver 425 and other components 430. The other components 430 may include, for example, an audio input device, an audio output device, a power supply, a data acquisition device, ports to electrically connect the UE 110 to other electronic devices, etc.

The processor 405 may be configured to execute a plurality of engines of the UE 110. For example, the engines may include a MSM engine 435. The MSM engine 435 may perform various operations related to MSM including, but not limited to, receiving MSM parameters, identifying a location of one or more Group 1 SSs, identifying a location of one or more Group 2 SSs and monitoring MSM. In addition, the MSM engine 435 may implement the various exemplary techniques introduced herein related to Rel-16 and Rel-17 SSSG switching interaction.

The above referenced engine 435 being an application (e.g., a program) executed by the processor 405 is merely provided for illustrative purposes. The functionality associated with the engine 435 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 405 is split among two or more processors such as a baseband processor and an applications processor. The exemplary embodiments may be implemented in any of these or other configurations of a UE.

The memory arrangement 410 may be a hardware component configured to store data related to operations performed by the UE 110. The display device 415 may be a hardware component configured to show data to a user while the I/O device 420 may be a hardware component that enables the user to enter inputs. The display device 415 and the I/O device 420 may be separate components or integrated together such as a touchscreen. The transceiver 425 may be a hardware component configured to establish a connection with the 5G NR-RAN 320, an LTE-RAN (not pictured), a legacy RAN (not pictured), a WLAN (not pictured), etc. Accordingly, the transceiver 425 may operate on a variety of different frequencies or channels (e.g., set of consecutive frequencies).

Figure 5:
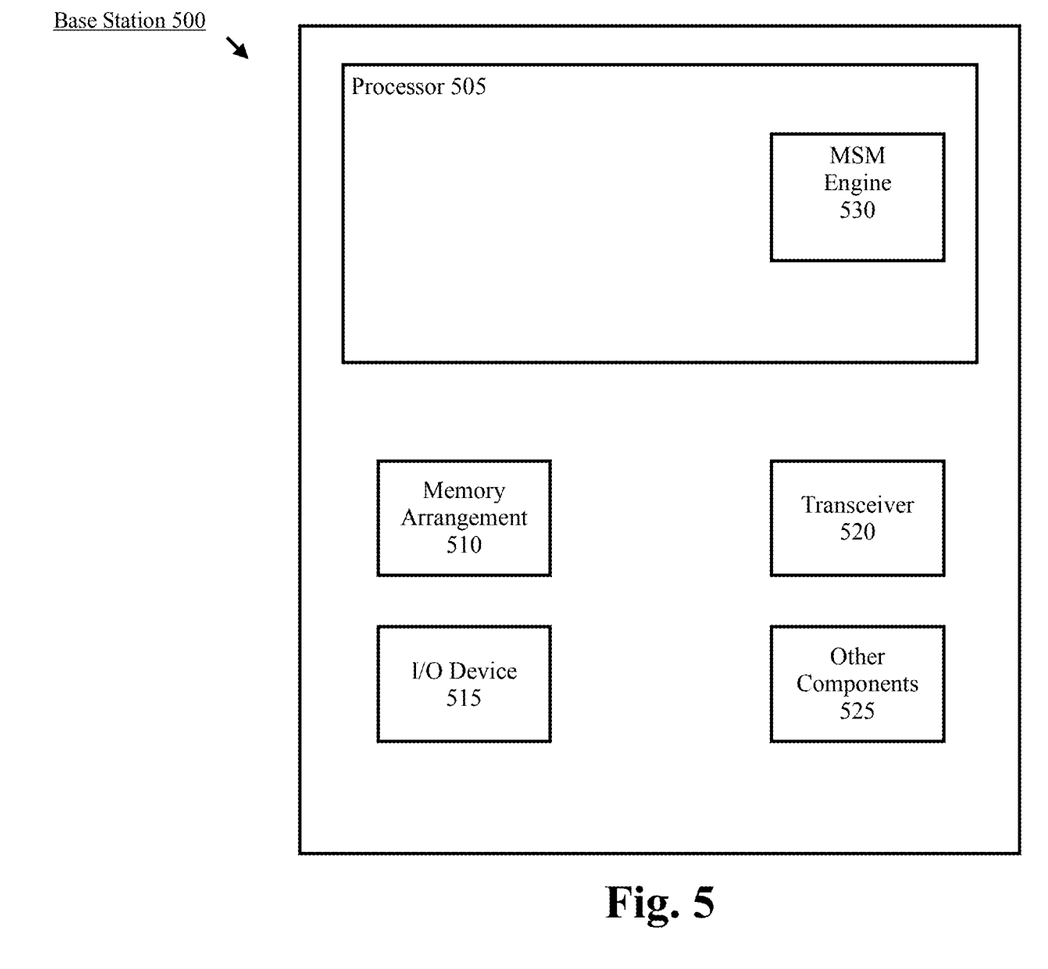
FIG. 5 shows an exemplary base station according to various exemplary embodiments.

FIG. 5 shows an exemplary base station 500 according to various exemplary embodiments. The base station 500 may represent the gNB 320A or any other access node through which the UE 110 may establish a connection and manage network operations.

The base station 500 may include a processor 505, a memory arrangement 510, an input/output (I/O) device 515, a transceiver 520, and other components 525. The other components 525 may include, for example, an audio input device, an audio output device, a battery, a data acquisition device, ports to electrically connect the base station 500 to other electronic devices, etc.

The processor 505 may be configured to execute a plurality of engines for the base station 500. For example, the engines may include a MSM engine 530. The MSM engine 530 may perform various operations related to the UE 110 performing MSM including, but not limited to, signaling MSM parameters to the UE 110, receiving capability information, configuring CSSs, configuring UE specific SSs, managing a BD/CCE budget and scheduling PDCCH resources for the UE 110.

The above noted engine 530 being an application (e.g., a program) executed by the processor 505 is only exemplary. The functionality associated with the engine 530 may also be represented as a separate incorporated component of the base station 500 or may be a modular component coupled to the base station 500, e.g., an integrated circuit with or without firmware. For example, the integrated circuit may include input circuitry to receive signals and processing circuitry to process the signals and other information. In addition, in some base stations, the functionality described for the processor 505 is split among a plurality of processors (e.g., a baseband processor, an applications processor, etc.). The exemplary embodiments may be implemented in any of these or other configurations of a base station.

The memory 510 may be a hardware component configured to store data related to operations performed by the base station 500. The I/O device 515 may be a hardware component or ports that enable a user to interact with the base station 500. The transceiver 520 may be a hardware component configured to exchange data with the UE 110 and any other UE in the network arrangement 300. The transceiver 520 may operate on a variety of different frequencies or channels (e.g., set of consecutive frequencies). Therefore, the transceiver 520 may include one or more components (e.g., radios) to enable the data exchange with the various networks and UEs.

Rel-16 and Rel-17 SSSG Switching Interaction

As mentioned above, the exemplary embodiments introduce techniques related to the interactions between Rel-16 SSSG switching mechanisms and Rel-17 SSSG mechanisms. In Rel-17, a SSSG switching timer and PDCCH skipping feature were introduced as a UE power saving enhancement for operation in frequency range (FR)-2 with 480 and/or 960 kHz SCS. However, it has been identified that these Rel-17 features may conflict with Rel-16 DCI format 2_0 based SSSG switching. The exemplary embodiments introduce techniques for enabling the operation of these Rel-16 and Rel-17 features.

The Rel-16 based SSSG switching mechanism may be configured with 2 SS sets where one of the SS sets is configured as a default SS set. The Rel-17 based SSSG switching mechanism may be configured with 3 SS sets where one of the SS sets is configured as a default SS set. Therefore, a scenario may occur where the UE 110 is configured with 5 SS sets with two different default SS sets, e.g., a Rel-16 default SS set and a Rel-17 default SS set.

Figure 6:
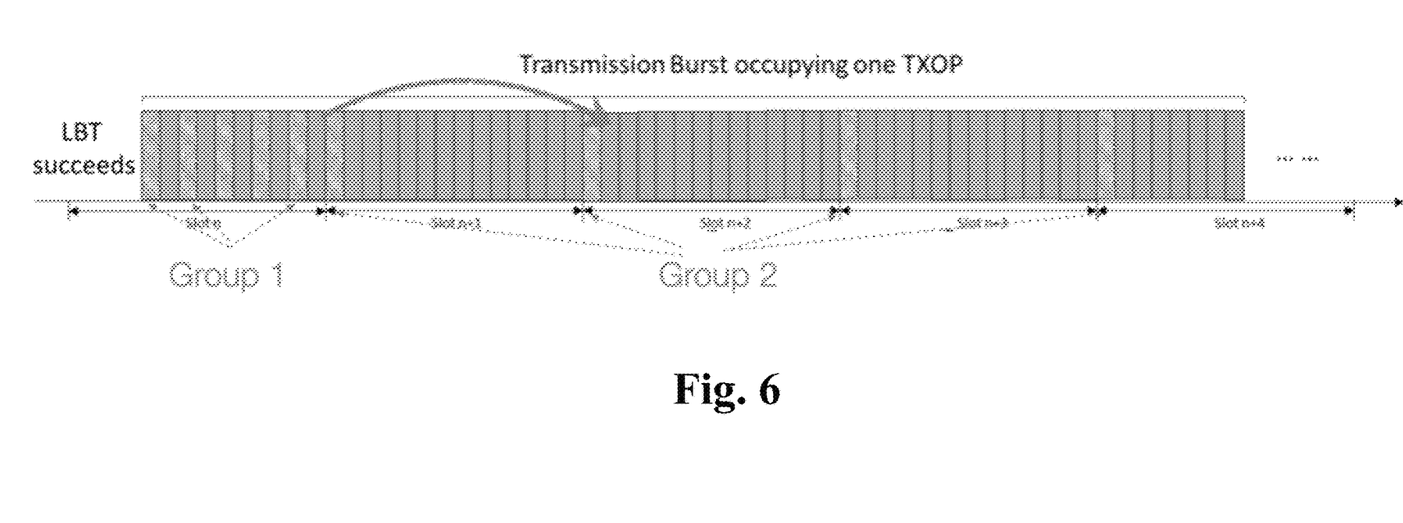
FIG. 6 shows an example of search space (SS) set group (SSSG) switching according to various exemplary embodiments.

The Rel-16 SSSG switching may provide power saving benefits in the unlicensed band. For instance, the UE 110 may be provided with at least two groups of SS sets for PDCCH. The UE 110 may be configured to switch between the groups. Those skilled in the art will understand that using the unlicensed band may include performing listen before talk (LBT) to determine whether the channel is occupied prior to performing a transmission on the channel. In some examples, after LBT is successful, the UE 110 may be configured with a dense SS set to enable the UE 110 to find a start of a slot. An example of this mechanism is shown in FIG. 6 during a transmission burst occupying one transmission opportunity (TXOP). In this example, after successful LBT and prior to a first full slot, a SS set (e.g., group index 1) may be used by the UE 110 to find the start of the first full slot. Subsequently, the UE 110 may switch to a sparser SS set (e.g., group index 2).

Figure 7:
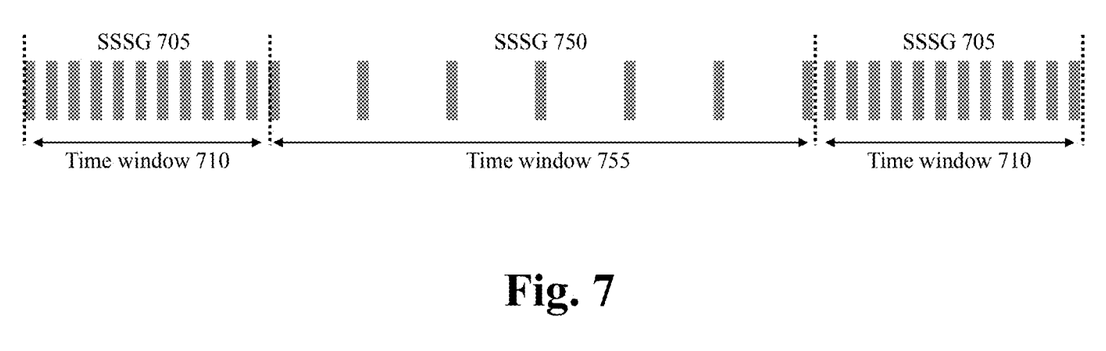
FIG. 7 shows an example of SSSG switching according to various exemplary embodiments.

In contrast, Rel-17 SSSG switching may provide power saving benefits to all bands (e.g., licensed, unlicensed, etc.). In some scenarios, the SSSG switching mechanism may be controlled by a SSSG switching timer operated by the UE 110. The value of the timer may be configured by the network and indicate when the UE 110 is to switch from monitoring a first SS set to monitoring a second different SS set. An example of SSSG switching is shown in FIG. 7. In this example, the UE 110 monitors a first SSSG 705 during time windows 710 and 715. The UE 110 monitors a second SSSG 750 during time window 755. The UE 110 may switch between monitoring the SSSG 705 and the SSSG 750 based on the SSSG switching timer or any other appropriate mechanism.

As indicated above, the exemplary embodiments introduce techniques for enabling the operation of different SSSG switching mechanisms at the UE 110 (e.g., Rel-16 SSSG switching and Rel-17 SSSG switching). In one approach, Rel-16 SSSG switching and Rel-17 SSSG switching may not be simultaneously configured. Thus, while the UE 110 may support both of the SSSG switching mechanisms, a base station may be barred from and/or intentionally avoid configuring the UE 110 with a simultaneous configuration of Rel-16 SSSG switching and Rel-17 SSSG switching. For example, the gNB 320A may identify that the UE 110 supports both of these mechanisms. The gNB 320A may then configure the UE 110 with one of Rel-16 SSSG switching or Rel-17 SSSG switching at a first time. Subsequently, the gNB 320A may configure the UE 110 with the other SSSG switching mechanism. However, the UE 110 intentionally avoids providing the UE 110 with a simultaneous configuration of Rel-16 SSSG switching and Rel-17 SSSG switching.

In another approach, Rel-16 SSSG switching and Rel-17 SSSG switching may be simultaneously configured when NR-dual connectivity (DC) and/or carrier aggregation (CA) is configured at the UE 110. However, the UE 110 does not expect to be simultaneously configured within a same band. For example, the network via one or more serving cells (e.g., primary cell (PCell), primary secondary cell (PSCell), secondary cell (SCell), etc.) may simultaneously configure the UE 110 with two different SSSG switching mechanisms (e.g., Rel-16 SSSG switching and Rel-17 SSSG switching). However, one of the SSSG switching mechanisms is configured for a first set of one or more frequency bands (or component carriers (CCs)) and the other SSSG switching mechanism is configured for a second different set of frequency bands (or CCs). Since the UE 110 does not expect to be simultaneously configured within a same band, the first set of frequency bands (e.g., unlicensed, etc.) may not include any frequency bands from the second set of frequency bands (e.g., licensed, etc.) or vice versa.

In a further approach, a simultaneous configuration of both Rel-16 SSSG switching and Rel-17 SSSG switching may be utilized. Thus, in some examples, there may be 5 SSs configured at the same time. In this example, a single default SS may be defined. In some embodiments, a default SS may be based on Rel-16 SSSG configuration where a first SS is utilized after LBT and prior to a first full slot. In other embodiments, the default SS may be based on the Rel-17 default configuration where a first SS is used after a first slot but before the end of the channel occupancy time (COT). In another embodiment, a default SS may be set by the network (e.g., gNB 320A). In contrast to the above example, the network may choose one of the configurations as the default SS and indicate to the UE 110 which SS is the default SSSG. Those skilled in the art will understand that the default SS is a SS that the UE 110 may be configured to monitor if there is no explicitly indicated SS. For example, in timer based switching, the UE 110 may be triggered to switch to a non-default group for a specific duration. When the duration expires, the UE 110 switches back to monitoring the default SS.

In another approach, the network may configure a maximum of 3 SSSG configurations comprising both Rel-16 and Rel-17 SSs mapping to the three. For example, consider a scenario in which the UE 110 is configured with timer based SSSG switching and a default SS. The UE 110 knows which SS to switch to for both Rel-16 and Rel-17 SSSG switching. Thus, when both Rel-16 and Rel-17 SSs are configured, the network (e.g., gNB 320A) may dynamically switch between Rel-16 and Rel-17 SSSG switching. The non-default Rel-16 SSSG switching SS may be mapped to one of the other two configurations while up to two Rel-17 SSSG switching SSs may be mapped to the non-default configurations.

In another approach, a mix of the Rel-16 SSSG switching mechanism and the Rel-17 SSSG switching mechanism may be implemented. With the approach, a monitoring group flag may be introduced in DCI format 2_0. This bit flag may be used to indicate a switch to a non-default Rel-17 SSSG SSs. For example, the UE 110 may receive configuration information for Rel-16 SSSGs and Rel-17 SSSGs. One of the mechanisms may be set as the default mechanism. For instance, the Rel-16 SSSG mechanism may be configured as a default mechanism. Thus, the UE 110 may initially utilize the default SSSG mechanism. During operation, the UE 110 may receive DCI format 2_0 with a bit flag set to indicate to the UE 110 that the UE 110 is to switch from the default SSSG mechanism to the other SSSG mechanism.

In some embodiments, the bit flag is present in the DCI (e.g., explicit signaling). When the bit flag is set to a first value (e.g., 1), the UE 110 may switch (or keep) monitoring Rel-17 SSSG SSs at the next applicable slot boundary relative to the detected DCI format 2_0. In addition, the UE 110 may initiate a configurable timer. As will be explained in more detail below, the timer may be used to trigger the SSSG switching.

When the bit flag is set to a second different value (e.g., 0), the UE 110 may switch (or keep) monitoring the default SS at the next appliable slot boundary relative to the detected DCI format 2_0.

In some embodiments, the DCI format 2_0 may not contain a bit flag (e.g., implicit switching) or the UE 110 may not monitor for DCI format 2_0. In this type of scenario, if any PDCCH in the default SS is successfully detected, the UE 110 may switch from Group 1 to the Rel-17 SSs at the next applicable slot boundary relative to the detected PDCCH. The next applicable boundary may refer to the earliest start of a slot that is at least P1 or P2 symbols later than the last symbol of the corresponding PDCCH. The values P1 and P2 may not be less than the processing time required for the UE 110 to perform the SS switching.

The UE 110 may initiate the timer in response to PDCCH (e.g., DCI or any other appropriate type of PDCCH). The UE 110 may switch from Rel-17 SSSG SSs to Group 1 at the earliest slot boundary that is at least P2 symbols after the end of the slot that coincides with the expiration of the timer or an indicated COT duration is exceeded.

In another example, for a frequency band with LBT (e.g., unlicensed, etc.), Rel-17 default SS may be configured for the UE 110 outside of an LBT region. When LBT starts, a Rel-16 default SS may be used. In addition, a CSS may be used at a start of a slot boundary.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described methods may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving configuration information for a first search space (SS) set of a first slot group for multi-slot physical downlink control channel (PDCCH) monitoring (MSM);
   receiving configuration information for a second SS set of a second slot group for MSM;
   performing MSM based on the first SS set; and
   switching from the first SS set to the second SS set using one of a first type of search space set group (SSSG) switching or a second type of SSSG switching.

2. The processor of claim 1, wherein the first type of SSG switching is release 16 (Rel-16) SSSG switching and the second type of SSG switching is release 17 (Rel-17) SSSG switching and wherein Rel-16 SSSG switching and Rel-17 SSSG switching are not simultaneously configured at the UE.

3. The processor of claim 1, wherein the UE is configured with one of new radio (NR)-dual connectivity (DC) or carrier aggregation (CA),
   wherein the first type of SSG switching is release 16 (Rel-16) SSSG switching and the second type of SSG switching is release 17 (Rel-17) SSSG switching, and
   wherein Rel-16 SSSG switching is configured within an unlicensed band and Rel-17 SSSG switching is configured within a licensed band simultaneously.

4. The processor of claim 1, wherein the UE is configured with one of new radio (NR)-dual connectivity (DC) or carrier aggregation (CA),
   wherein the first type of SSG switching is release 16 (Rel-16) SSSG switching and the second type of SSG switching is release 17 (Rel-17) SSSG switching, and
   wherein Rel-16 SSSG switching and Rel-17 SSSG switching are not simultaneously configured within a same band.

5. The processor of claim 1, wherein the UE is configured with five different SS sets,
   wherein the first type of SSG switching is release 16 (Rel-16) SSSG switching and the second type of SSG switching is release 17 (Rel-17) SSSG switching, and
   wherein Rel-16 SSSG switching and Rel-17 SSSG switching are simultaneously configured.

6. The processor of claim 5, wherein a single default configuration for SSSG switching is based on a Rel-16 SSSG configuration.

7. The processor of claim 5, wherein a single default configuration for SSSG switching is based on a Rel-17 SSSG configuration.

8. The processor of claim 5, the operations further comprising:
   receiving a signal from a base station indicating a default configuration for SSSG switching.

9. The processor of claim 1, the operations further comprising:
   receiving downlink control indication (DCI) indicating that the UE is to perform MSM using a release 16 (Rel-16) SS during listen before talk (LBT) and release 17 (Rel-17) SS at a next slot boundary relative to the LBT.

10. A processor of a base station configured to perform operations comprising:
    transmitting configuration information to a user equipment (UE) for a first search space (SS) set of a first slot group for multi-slot physical downlink control channel (PDCCH) monitoring (MSM); and
    transmitting configuration information to the UE for a second SS set of a second slot group for MSM, wherein the UE is configured to perform search space set group (SSSG) switching between the first SS and the second SS.

11. The processor of claim 10, wherein the base station configures three SS sets for the UE with both release 16 (Rel-16) and release 17 (Rel-17) SS sets mapping to the three SS sets.

12. The processor of claim 11, wherein a single default configuration is set for both the Rel-16 SS sets and the Rel-17 SS sets.

13. The processor of claim 12, wherein a Rel-17 SS is mapped to a non-default configuration.

14. The processor of claim 10, the operations further comprising:
    transmitting downlink control indication (DCI) to the UE indicating that the UE is to perform MSM using a release 17 (Rel-17) SS at a next slot boundary relative to the DCI.

15. The processor of claim 10, the operations further comprising:
    transmitting downlink control indication (DCI) to the UE indicating that the UE is to perform MSM using a default SS at a next slot boundary relative to the DCI.

16. A method performed by a user equipment (UE), comprising:
    receiving configuration information for a first search space (SS) set of a first slot group for multi-slot physical downlink control channel (PDCCH) monitoring (MSM);
    receiving configuration information for a second SS set of a second slot group for MSM;
    performing MSM based on the first SS set; and
    switching from the first SS set to the second SS set using one of a first type of search space set group (SSSG) switching or a second type of SSSG switching.

17. The method of claim 16, wherein the first type of SSG switching is release 16 (Rel-16) SSSG switching and the second type of SSG switching is release 17 (Rel-17) SSSG switching and wherein Rel-16 SSSG switching and Rel-17 SSSG switching are not simultaneously configured at the UE.

18. The method of claim 16, wherein the UE is configured with one of new radio (NR)-dual connectivity (DC) or carrier aggregation (CA),
    wherein the first type of SSG switching is release 16 (Rel-16) SSSG switching and the second type of SSG switching is release 17 (Rel-17) SSSG switching, and
    wherein Rel-16 SSSG switching is configured within an unlicensed band and Rel-17 SSSG switching is configured within a licensed band simultaneously.

19. The method of claim 16, wherein the UE is configured with one of new radio (NR)-dual connectivity (DC) or carrier aggregation (CA),
- wherein the first type of SSG switching is release 16 (Rel-16) SSSG switching and the second type of SSG switching is release 17 (Rel-17) SSSG switching, and
- wherein Rel-16 SSSG switching and Rel-17 SSSG switching are not simultaneously configured within a same band.

20. The method of claim 16, wherein the UE is configured with five different SS sets,
- wherein the first type of SSG switching is release 16 (Rel-16) SSSG switching and the second type of SSG switching is release 17 (Rel-17) SSSG switching, and
- wherein Rel-16 SSSG switching and Rel-17 SSSG switching are simultaneously configured.

* * * * *